Figure 1:
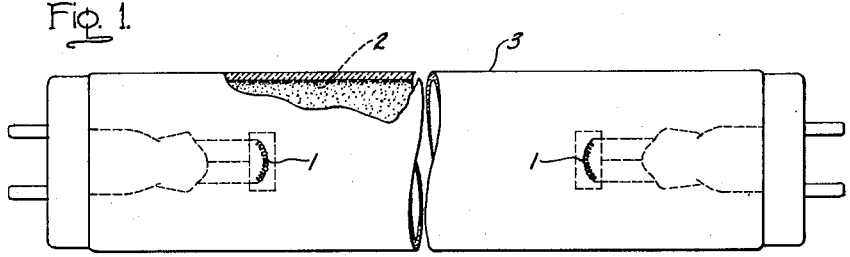

April 19, 1955     F. SCHAEFER     2,706,691

METHOD OF COATING GLASS BULBS

Filed May 10, 1950

Inventor:
Franz Schaefer,
by Vernet C. Kauffman
His Attorney.

United States Patent Office 2,706,691
Patented Apr. 19, 1955

2,706,691

METHOD OF COATING GLASS BULBS

Franz Schaefer, Berlin, Germany, assignor to Osram G. m. b. H. Kommanditgesellschaft, a Germany company Application May 10, 1950, Serial No. 161,192

Claims priority, application Germany May 18, 1949

5 Claims. (Cl. 117—33.5)

This invention relates to a method of depositing a coating of fine powder on the glass walls of electric lamps, etc., wherein the glass wall is coated with a suspension containing the fine powder and, after pouring off the excess suspension, the remaining film is dried. The method comprising the invention is especially suitable for coating the inside walls of electric incandescent lamps or discharge tubes with a thin layer of light-diffusing, coloring, opalizing, "gettering" or radiation-transforming finely powdered materials, singly or mixed, for example, in the manufacture of frosted incandescent lamps or fluorescent lamps.

An object of the invention is to provide a method which will produce a firmly adherent coating of the powdered material.

It is a further object of the invention to provide a coating method of the character set forth above and which obviates the need for organic binders, such as solutions of nitrocellulose in amyl acetate heretofore employed as the suspension medium and tending to leave an objectionable carbon residue upon heating to burn out the binder.

A further object is to provide a coating method wherein the realtively costly and inflammable solvents or thinners are replaced by water.

Another object is to provide a method of coating fluorescent lamps with powdered phosphors wherein the drop in brightness of the finished lamp during normal burning is reduced to a fraction of that incurred by the method employing nitrocellulose binder.

Another object is to provide a method of coating incandescent lamps with light-diffusing materials to provide uniform diffusion over the entire bulb with a very small loss of light.

Further objects and advantages of the invention will appear from the following description.

According to the invention, I preferably employ a solvent consisting of water to which, in order to produce the necessary viscosity, are added certain inorganic materials, preferably hydrogels of metal fluorides and/or double fluorides, which are dissolved colloidally or form a gel and with which the coating powder is mixed. This produces a suspension which, when spread on the glass wall and dried, solidifies into a glassy film giving an excellent, uniform, adherent coating. By using, for example, a suspension heated to 60–80° C. or a hot gas blast, the drying process may be considerably accelerated.

The requirements as to the correct viscosity and composition of the suspension, which is preferably uniformly mixed by means of a stirring device, are very critical, which explains why numerous previous attempts to produce economically satisfactory coatings with water as the solvent or suspension medium have been unsatisfactory. For example, it is very important to select those inorganic materials which impart the necessary viscosity to the solvent, preferably water, even at a relatively low concentration, for example, less than 10%, preferably even less than 5% by weight. Excellent coatings, also for electric lamps, may be obtained especially with fluorides of magnesium or calcium. Good results have also been obtained with hydroxides of aluminum or zinc, and with basic or neutral phosphates, for example, aluminum, titanium, zirconium, singly or admixed.

In some cases it is advisable to add to the colloidal solution, or the gel, certain materials such as, for example, alcohol, boric acid, phosphoric acid or alkaline salts, which will maintain the required viscosity of the suspension for a longer time or will assist in the development of a thin, uniform, well-adhering coating.

Depending upon the nature, especially of chemical composition and thickness, of the desired coating the process will naturally vary greatly as the suspension may also be sprayed on the glass.

In the production of incandescent lamps with outside light-diffusing films, silicic acid (or silica), magnesium oxide, zinc oxide, titanium oxide or aluminum oxide are added as light-diffusing materials to the colloidal solution, or the gel, singly or mixed, and are coated on the glass wall.

In the production of so-called inside frosted incandescent lamps, a suitable suspension comprises, for example, 22 grams of magnesium fluoride and 11 grams of calcium fluoride to 1,100 cc. of water as the inorganic materials that produce the gel, and also 66 grams of silicic acid (or silica) as light-diffusing material, as well as 10 cc. of phosphoric acid as adhesion means. This suspension is poured or squirted into the glass bulb and the latter, after the excess suspension has been drained off, is then dried and baked in an oven at a temperature of about 400° C. The resulting uniform, fine frosting completely eliminates glare, especially when the wall had previously been etched (as, for example, in Patent 1,687,510, Pipkin), distributes the light over the entire bulb and results in a surprisingly small loss of light. Such coatings have such a favorable effect upon the (voltage) breakdown strength of the incandescent lamp that a filling of argon with less than 10%, or even less than 5% nitrogen can be used, which is known to make possible a higher light output of the incandescent lamp.

In the production of tubular incandescent lamps with an opal-glassy appearance, it is advisable to prepare a diluted colloidal sodium-silicic-acid solution by treating silicic acid, preferably silicic acid gel, with caustic soda, whose content of silicic acid is considerably higher, preferably about 2 to 3 times higher than in $Na_2SiO_3$. To this colloidal solution is then added the light-diffusing metal-oxide powder. A suitable mixture consists, for example, of 1,100 cc. of water, 85 grams of sodium hydroxide, 170 grams of silicic acid, and 100 grams of magnesium oxide, the content of silicic acid being about 2.8 times higher than in $Na_2SiO_3$. Incandescent lamps produced in this inexpensive manner show remarkable similarity to opal glass tubes. The inner coating adheres so strongly to the glass that the filament holder, or "mount," may be introduced in the tube without damaging the coating. The high content of silicic acid insures the stability of the coating at the high temperatures which have to be used in the manufacture of the lamp.

The new method is also highly suitable for coatings of finely divided fluorescent powders which emit visible and/or invisible radiation, for example, in the manufacture of low pressure mercury luminescent lamps. In the method now used in the manufacture of such lamps, in which the suspension is pushed up in the vertical glass tube and then again lowered, use is made of organic solvents and binders, a solution of nitrocellulose in butyl acetate or amyl acetate being used almost exclusively. The nitrocellulose is burned off when the finished coated tube is fired. In this process combustion residues are unavoidable in the luminescent layer which ultimately will impair the operating characteristics of the lamp.

If, one the contrary, the luminescent material is precipitated or deposited with water, according to the invention, and a colloidal solution or a gel is produced through the addition of suitable inorganic materials, for example, fluorides of magnesium or calcium, these harmful combustion residues are eliminated. By using the luminescent material most sparingly, the new method produces very fine and uniform coatings which impart to the lamps a good appearance and a high efficiency and a particularly low loss of light during the life of the tube.

The high luminous efficiency of the lamps made according to the invention might, to a certain degree, be due to the fact that the inorganic materials (which must, naturally, be highly permeable to ultraviolet and visible radiation) added to the water protect the particles of the luminescent material of the finished coating against the harmful effect of the electric discharge and also have a certain "getter" effect.

In preparing the suspension, the percentage by weight of the inorganic materials, which produce the colloidal solution or the gel, should be considerably less than the amount of luminescent material; preferably less than 30% of the weight of the luminescent material.

If necessary, other materials may also be added to the suspension of the luminescent powder, for example, colorants, light-diffusing materials or getters. It is also recommended that the luminescent materials to be deposited contain very little and preferably no free metal oxide, so as to prevent a harmuful hydration of the luminescent material.

The jelly-like deposits from a mineral acid solution produced by precipitation, if necessary with the help of ammonia, need not be thoroughly freed of the electrolytes produced in the precipitation process. In some cases a certain amount of crystalloids is even an advantage as it prevents a drop in the viscosity of the suspension in various jellies.

Fig. 1 in the attached drawing shows, in elevation, an example of a low pressure mercury-luminescent lamp with incandescent electrodes 1, 1 whose luminescent coating 2 was produced by covering the inner wall of the envelope 3 with a suspension containing 40 grams of magnesium fluoride and 500 grams of the luminescent powder to 1,400 cc. of water, the luminescent powder consisting of halogen phosphates (such as those disclosed and claimed in Patent 2,488,733, McKeag et al.) or a mixture of 60% zinc beryllium silicate and 40% magnesium tungstate.

The $MgF_2$ binder may be prepared as follows:

283 grams of $MgCl_2.6H_2O$ are dissolved in 550 cc. of $H_2O$, and 90 grams of $NH_4HF_2$ in 400 cc. of $H_2O$. The $NH_4HF_2$ solution is poured slowly in the $MgCl_2$ solution, at room temperature, stirring it all the while, and the whole is neutralized with $NH_3$ to an acidity of pH8. The $MgF_2$ thus formed is allowed to settle overnight, the upper clear solution is siphoned off and the rest is filtered through a suction filter and is washed twice with 400 cc. of $H_2O$ each time. $H_2O$ is added to the finished $MgF_2$ up to 1 liter. It contains 4.5 to 5 grams of chlorine.

The coating paste or suspension may be prepared as follows:

Grind 500 grams of the fluorescent material with 500 cc. $H_2O$ and 500 cc. $MgF_2$-binder for three hours. Add another 275 cc. of $MgF_2$-binder and 900 cc. $H_2O$ and shake it for one hour in a shaking machine. 500 grams of the luminescent material require about 60 grams of $MgF_2$-12%.

To coat the bulbs or tubes, the luminescent paste is pushed upwards in a vertical glass tube by compressed air. After draining the paste, the coated tube is placed in a stand in a vertical position. Hot air is led through the tube flask from above to evaporate the water of the adhering paste. The air temperature is about 300° C. and the air flow is about 2000 liters per hour. The drying takes 5 minutes. The coating process is preferably repeated once more.

Figure 2:
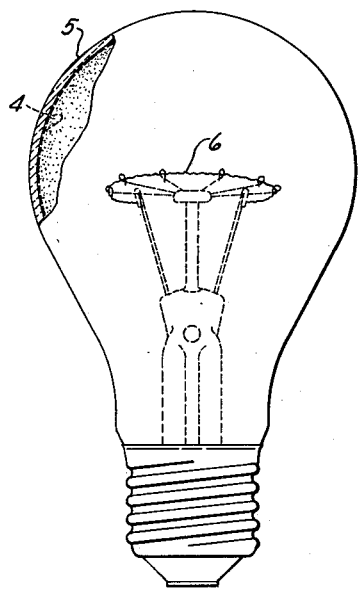

Fig. 2, shows, in elevation, a frosted electric incandescent bulb with a fine uniform coating 4 of silicic acid deposited by the method of the invention on the inside wall of the bulb 5 containing the filament 6.

What I claim as new and desire to secure by Letters Patent of the United States is:

1. The method of applying a light-diffusing coating to a glass incandescent lamp bulb which comprises preparing an aqueous suspension containing, in approximately the relative proportions stated, 22 grams of magnesium fluoride, 11 grams of calcium fluoride, 66 grams of silicic acid and 10 cc. of phosphoric acid, applying a layer of the suspension to the inner surface of the bulb, and baking the coated bulb at a temperature of the order of 400° C.

2. The method of coating a fluorescent lamp envelope which comprises preparing an aqueous suspension of an inorganic powdered phosphor and magnesium fluoride in relative proportions of about 40 grams of magnesium fluoride to 500 grams of the phosphor, applying a layer of the suspension to the inner surface of the envelope, and evaporating the water to dry the said layer.

3. The method of coating the glass envelopes of electric lamps and discharge tubes with a layer of fine grained pulverulent light-modifying material which is insoluble in water which comprises dispersing in water a gel-forming inorganic insoluble metal fluoride of the class consisting of fluorides of magnesium and calcium and mixtures thereof and adding thereto the pulverulent material, applying a layer of the suspension so formed to a surface of the envelope, and evaporating the water to dry the said layer.

4. The method of coating the glass envelopes of electric lamps and discharge tubes with a layer of fine grained pulverulent light-modifying material which is insoluble in water which comprises dispersing in water a gel-forming inorganic insoluble magnesium fluoride and adding thereto the pulverulent material, applying a layer of the suspension so formed to a surface of the envelope, and evaporating the water to dry the said layer.

5. The method of coating the glass envelopes of electric lamps and discharge tubes with a layer of fine grained pulverulent light-modifying material which is insoluble in water which comprises dispersing in water a gel-forming inorganic insoluble calcium fluoride and adding thereto the pulverulent material, applying a layer of the suspension so formed to a surface of the envelope, and evaporating the water to dry the said layer.

References Cited in the file of this patent

UNITED STATES PATENTS

| 2,109,984 | Aicher | Mar. 1, 1938 |
| 2,219,899 | Jenkins | Oct. 29, 1940 |
| 2,278,742 | Scott et al. | Apr. 7, 1942 |
| 2,281,475 | Cartwright et al. | Apr. 28, 1942 |
| 2,421,208 | Leverenz | May 27, 1947 |
| 2,451,590 | Tidik et al. | Oct. 19, 1948 |
| 2,528,384 | Mitchell | Oct. 31, 1950 |
| 2,601,124 | Moulton | June 17, 1952 |

FOREIGN PATENTS

| 4,762 | Great Britain | of 1881 |
| 501,624 | Great Britain | Mar. 2, 1939 |